US008447730B1

(12) United States Patent
Mortazavi et al.

(10) Patent No.: US 8,447,730 B1
(45) Date of Patent: May 21, 2013

(54) PROBE SYSTEM FOR REPLICATION MONITORING

(75) Inventors: Masood Mortazavi, San Jose, CA (US); Jacob Y. Levy, Los Altos, CA (US); Sahaya Andrews Albert, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 13/363,148

(22) Filed: Jan. 31, 2012

(51) Int. Cl.
 *G06F 17/30* (2006.01)
(52) U.S. Cl.
 USPC .......................................................... 707/634
(58) Field of Classification Search
 USPC .......................................... 707/634, 637, 659
 See application file for complete search history.

(56) References Cited

U.S. PATENT DOCUMENTS

| | | | | |
|---|---|---|---|---|
| 6,735,603 B2 * | 5/2004 | Cabrera et al. | ................. | 713/100 |
| 6,938,084 B2 * | 8/2005 | Gamache et al. | ............. | 709/226 |
| 7,213,040 B1 * | 5/2007 | Stokes et | ............................... | 1/1 |
| 7,584,224 B2 * | 9/2009 | Cabrera et al. | ........................ | 1/1 |
| 7,610,510 B2 * | 10/2009 | Agarwal et al. | ................. | 714/12 |
| 7,693,891 B2 * | 4/2010 | Stokes et al. | ................... | 707/695 |
| 7,739,239 B1 * | 6/2010 | Cormie et al. | ................ | 707/626 |
| 7,743,271 B2 * | 6/2010 | Tso | ................ | 713/500 |
| 7,774,469 B2 * | 8/2010 | Massa et al. | .................. | 709/226 |
| 7,890,916 B1 * | 2/2011 | Donlin et al. | ................. | 716/116 |
| 7,984,155 B2 * | 7/2011 | Massa et al. | .................. | 709/226 |
| 8,010,648 B2 * | 8/2011 | Ogus et al. | .................. | 709/223 |

* cited by examiner

*Primary Examiner* — Cam-Linh Nguyen
(74) *Attorney, Agent, or Firm* — Hickman Palermo Truong Becker Bingham Wong LLP (57) ABSTRACT

A ProbeSystem for one or more Replicas is disclosed. For each replica, the Probe System includes a ProbeHead that updates a Head field in a Target Record pertaining to the Replica and a ProbeEcho that updates an Echo field in the TargetRecord. The Head field includes a time stamp and an epoch value. The Echo field includes a latency value and an epoch value. The fields are such that, during reporting, the ProbeHead can analyze the TargetRecord for the replica to determine the latency between one or more paths between the Replica and other Replicas. The ProbeSystem has a peer-to-peer shared nothing architecture and applies to a large class of high-replica, distributed and high-scale cloud storage systems and services.

31 Claims, 10 Drawing Sheets

*Target Record*

Fields and Values

*Probe System*

Handling of the Target Record

| | Field Name | Time Stamp or Latency | Value (Experiment) | Updated by | Reported by |
|---|---|---|---|---|---|
| 202 | Head_1 | 50 (ts) | 789 | ProbeHead_1 | ProbeSystem-1 |
| 204 | Echo_2_1 | 3 (latency) | 789 | ProbeEcho_2 | (for replication |
| 206 | Echo_3_1 | 3 (latency) | 789 | ProbeEcho_3 | from replica-1) |
| 208 | Head_2 | 52 (ts) | 101 | ProbeHead_2 | ProbeSystem-2 |
| 210 | Echo_3-2 | 3 (latency) | 100 | ProbeEcho_3 | (for replication |
| 212 | Echo_1_2 | 2 (latency) | 100 | ProbeEcho_1 | from replica-2) |
| 214 | Head_3 | 51 (ts) | 206 | ProbeHead_3 | ProbeSystem_3 |
| 216 | Echo_1_3 | 3 (latency) | 206 | ProbeEcho_1 | (for replication |
| 218 | Echo_2_3 | 2 (latency) | 205 | ProbeEcho_2 | from replica-3) |

| Replica | ProbeSystem | Probe Components |
|---|---|---|
| Replica-1 | ProbeSystem-1 | ProbeHead-1 |
| | | ProbeEcho-1 |
| Replica-2 | ProbeSystem-2 | ProbeHead-2 |
| | | ProbeEcho-2 |
| Replica-3 | ProbeSystem-3 | ProbeHead-3 |
| | | ProbeEcho-3 |
| ... | ... | ... |
| | | ... |
| Replica-n | ProbeSystem-n | ProbeHead-n |
| | | ProbeEcho-n |

PROBE SYSTEM FOR REPLICATION MONITORING

FIELD OF THE INVENTION

The present invention relates to Replica systems and particular to a Probe System that determines the latency and health of paths within such systems.

BACKGROUND

In high-replica count systems or in systems where replication can be performed across a large number of zones or regions, it is critical to measure and monitor all possible replication paths to ensure that those paths are healthy and functioning. Failures can occur due to large backlogs, replication volume failures, end-point failures, transmission message failures or other kinds of failures along any one of the paths. Furthermore, such monitoring is best performed by a probe system that does not unduly burden the serving system or affect the multi-tenant cloud services it provides. In other words, resources used for probing should be infinitesimally small compared to general serving resources. Finally, monitoring computations should be reliable and available relatively immediately.

SUMMARY

One embodiment of the present invention is a probe system that has a completely decentralized architecture which partitions replication monitoring based on the origin of the replicated transaction. Each replica has its own instance of a Probe System. Each Probe System includes a Probe Head and a Probe Echo. The probe head issues experiments on a set of Target Records, marking them with an Epoch value and a time stamp. (Target Records are selected to exercise all Replication Channels.) The Probe Echo instance completes its leg of the experiment by echoing the Head's probe, with the same experiment Epoch value and a latency value. Finally, the probe head computes and reports replication metrics based on received echoes. The system can operate with partial failures and new Probe Systems can be added for new replicas without having to reconfigure any of the existing probe systems.

Yet another embodiment of the present invention is a method of probing replication paths in a computer system. The embodiment includes (i) creating a new instance of a probe system on a first replica computer system, where the probe system includes a probe head and a probe echo, (ii) creating a target record on a second replica computer system, where the target record includes a head field and an echo field, the head field includes an epoch value and a time stamp, and the echo field includes an epoch value and a latency value, (iii) updating the epoch value and the time stamp in the head field by sending the probe head of the new instance from the first replica computer system to the second replica computer system, (iv) updating the epoch value and the latency value in the echo field by sending the probe head of the new instance from the first replica computer system to the second replica computer system if the epoch value in the echo field is less than the epoch value in the head field, wherein the latency value is a measurement of time to communicate between the first and second replica computer systems, and (v) obtaining a report that gives any communication latency for a communication starting in the first replica computer system and ending in the second replica computer system.

One advantage of the new probe system is its peer-to-peer architecture. Another advantage is the system's capability to maintain high levels of measurement fidelity for a range of write throughput budget allowed, by the cloud storage system, for probe system consumption.

Yet another advantage is the system's distributed protocol, algorithm and data schema that produce a unique capability for online monitoring of replication system without any reliance on logging or off-line analysis.

Yet another advantage is the system's broad applicability to a large class of high-replica, distributed and high-scale cloud storage systems and services. The probe system writes keys and values, where the values are composed of disjoint columns, and transactions specify the columns they are updating.

Yet another advantage is the system's completely decentralized architecture, with no master or slave.

Yet another advantage is the system's capability to be deployed independently of the storage system itself.

Yet another advantage is the system's capability to monitor and exercise all available replication channels.

Yet another advantage is the system's capability to continue operating despite partial failures, i.e., no operational interdependence is required or assumed.

Yet another advantage is the system's capability to add new probe systems without any requirement to configure any other, active probe systems.

BRIEF DESCRIPTION OF THE DRAWINGS

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

In the drawings.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

General Overview

Figure 1A:
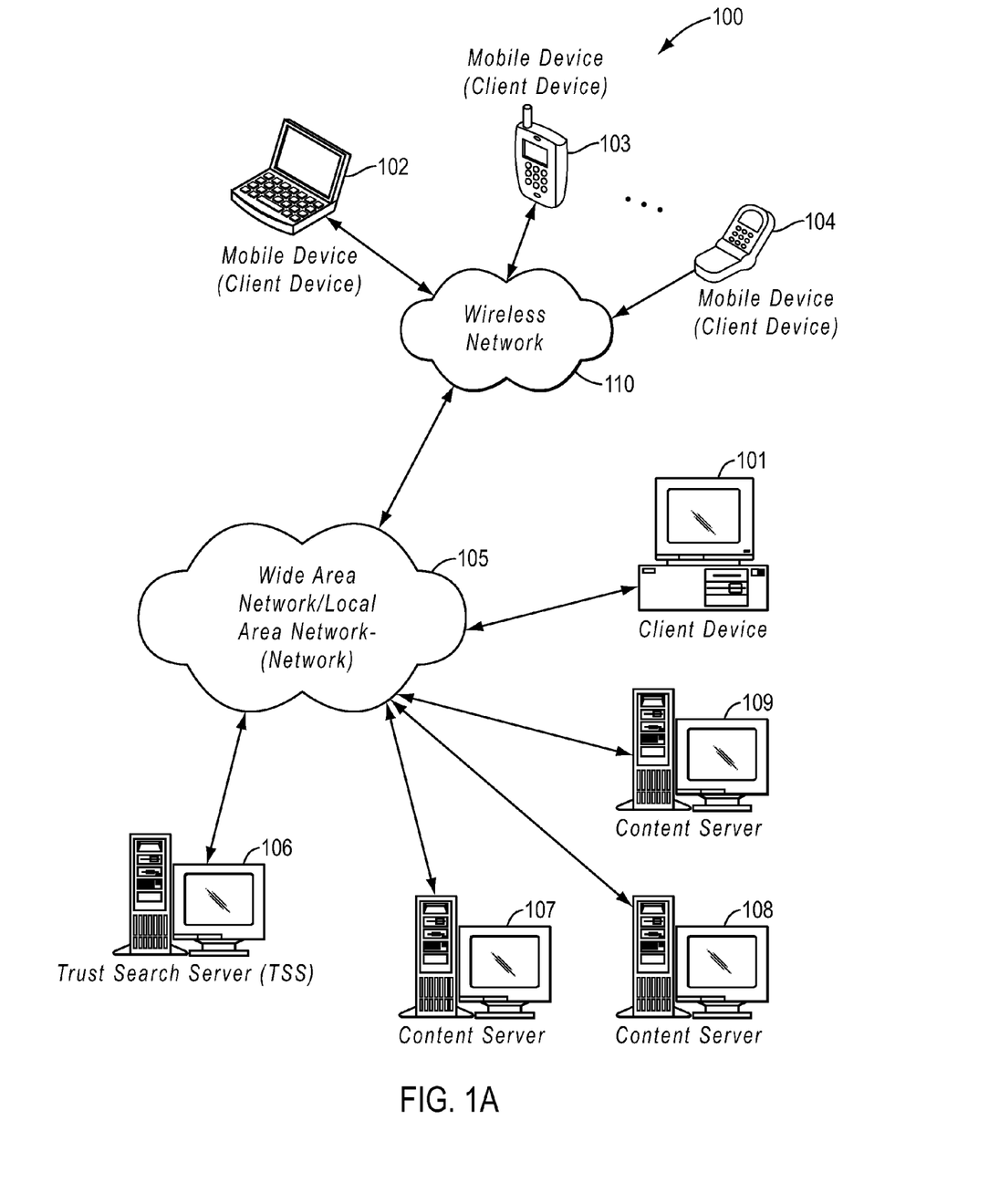
FIG. 1A illustrates a system setting in accordance with one embodiment.

FIG. 1A is a schematic diagram illustrating an example embodiment of a network. Other embodiments that may vary, for example, in terms of arrangement or in terms of type of components, are also intended to be included within claimed subject matter. As shown, FIG. 1A, for example, includes a variety of networks, such as local area local area network (LAN)/wide area network (WAN) 105 and wireless network 110, a variety of devices, such as client device 101, mobile devices 103, 104, and a variety of servers, such as content servers 107, 108, 109 and search server 106.

Content server 107 includes a content delivery network or "content distribution network" (CDN). This generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, Domain Name System (DNS) request handling, provisioning, signal monitoring and reporting, content targeting, personalization, or business intelligence. A CDN may also enable an entity to operate or manage another's site infrastructure, in whole or in part.

In an embodiment, the present invention operates in the environment of the one or more servers of a network, as shown in FIG. 1A.

Figure 1B:
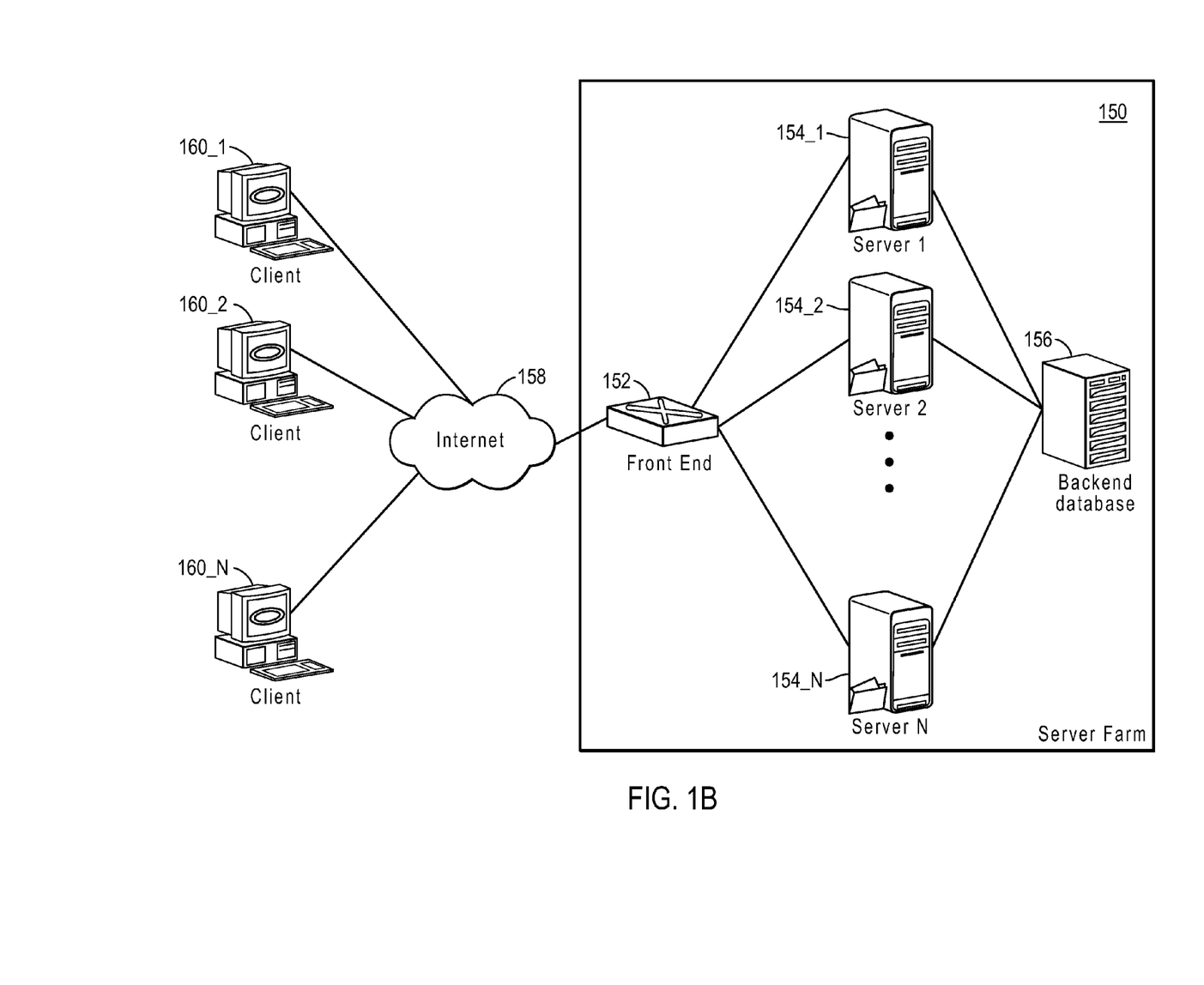
FIG. 1B illustrates a system setting in accordance with another embodiment.

FIG. 1B is a diagram illustrating an example embodiment of a server farm 150. Other embodiments that may vary, for example, in terms of arrangement or in terms of type of components, are also intended to be included within claimed subject matter. The server farm 150 may be used to support the cloud computing referred to above. The server farm 150 includes a front end 152 such as a link-layer switch or Internet Protocol (IP) router that balances the load across the available servers, a plurality of servers 154_1, 154_2, 154_N, and a backend database 156 that stores content and gives the available servers 154_1, 154_2, 154_N access to the same content information. Clients 160_1, 160_2, 160_N access the server farm 150 via Internet 158, which connects to the front end 152. In an embodiment, the present invention operates in the environment of a server farm 150 that includes a plurality of servers 154_1, 154_2, 154_N, as shown in FIG. 1B.

One embodiment of the present invention is a Probe System that operates to determine the health and latency of replica paths within a Replica system. A Replica system is one that includes replication channels that can be tested, where a channel is any resource along a path that is used in multiplexed mode, potentially by multiple replication messages. The Probe System includes for each Replica a ProbeHead and a ProbeEcho. In one embodiment, the Probe Head is an instance of an Object of the ProbeHead class and the ProbeEcho is an instance of an Object of a ProbeEcho class. The ProbeHead updates data in a Target Record for a channel and the ProbeEcho uses that data to help determine the latency of a path to the system having the Target Record. Thus, the Target Record includes information relating to the latency of all paths that lead to the system having the Target Record. By constructing a report using the Target Record, information about the health and latency of each path to the system having the Target Record is available.

The Target Record

Figure 2:
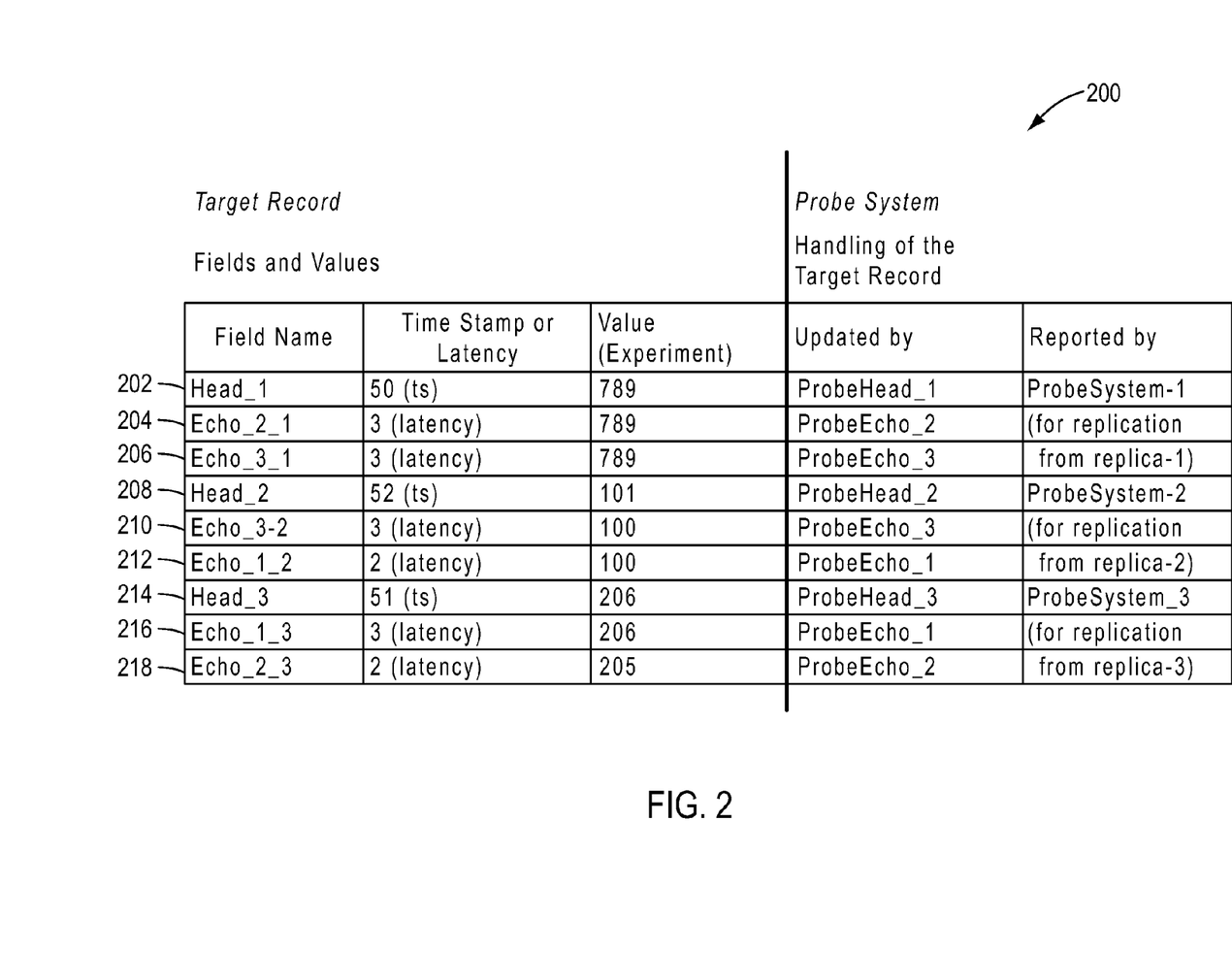
FIG. 2 illustrates the target records used by the probe system.

FIG. 2 illustrates the target records used by an embodiment of the probe system. Each Target Record is includes multiple Head_i fields 202, 208, 214, one for each Replica_i, and multiple Echo_j_i fields 204, 206, 210, 212, 216, 218, one for each pair of Replica<i,j>. The names (or the identifiers) for Target Records are selected such that each Target Record falls within a different replication or processing channel and touches replication-sensitive system components. For example, in a 128×128×128 hierarchy of directories, one may choose 128 Target Records, each falling within a distinct top-level director. Record names are selected such that the names hash to distinct top level directories. In another example, such as a multi-tenant storage system, one may choose 48 Target Records, each falling within one of 48 distinct replication volumes. Record names are selected such that the names hash to the distinct replication volumes.

In each Target Record, a Head_i field 202, 208, 214 contained therein includes (a) a time stamp and (b) in one embodiment, a monotonically increasing value, called the Epoch value. For example, in FIG. 2, Head_1 202 has a time stamp value of 50 and an Epoch value of 789. Head_2 208 has a time stamp of 52 and an Epoch value of 101. Head_3 214 has a time stamp value of 51 and an Epoch value of 206.

In each Target Record, an Echo_i_j field 204, 206, 210, 212, 216, 218 contained therein includes (a) an arrival latency value and (b) an Epoch value. The Echo field thus represents echoes from Replica_i to Replica_j in response to updates from Replica_j which occur in response to reading a new Epoch value in the Head_j field of a given TargetRecord.

Referring again to FIG. 2, for ProbeSystem 1, Echo_2_1 204 has a latency value of 3 and an Epoch value of 789 and echo_3_1 206 has a latency of 3 and an Epoch value of 789. This means that there is a latency of 3 between replica_2 and replica_1 and a latency of 3 between replica_3 and replica_1. For ProbeSystem 1, ProbeEcho_2 updates the latency in Echo_2_1 and ProbeEcho_3 updates the latency in Echo_3_1.

For ProbeSystem 2, Echo_3_2 210 has a latency of 3 and an Epoch value of 100 and Echo_1_2 212 has a latency of 2 and an Epoch value of 100. This means that there is a latency of 3 between replica_3 and replica_2 and a latency of 2 between replica_1 and replica_2. For ProbeSystem 2, ProbeEcho_1 updates the latency of Echo_1_2 212 and ProbeEcho_3 updates the latency in Echo_3_2 210.

For ProbeSystem 3, Echo_1_3 216 has a latency of 3 and Epoch value of 206 and Echo_2_3 218 has a latency of 2 and an Epoch value of 205. This means that there is a latency of 3 between replica_1 and replica_3 and a latency of 2 between replica_2 and replica_3. For ProbeSystem 3, ProbeEcho_2 updates the latency of Echo_2_3 218 and ProbeEcho_1 updates the latency of Echo_1_3 216.

In general, the Echo_i_j field of TargetRecord j is updated by ProbeEcho_i where i=1, 2, ... M and i # j. In effect, the index j for the TargetRecord identifies a channel in which replication can occur.

Thus, if N is the number of replicas and M is the number of Probe System instances, M is always less than or equal to N. Additionally, there are M active Head_i fields, where i=1, 2 ... M, and M·(M−1) active Echo_i_j fields, for i,j=1, 2, ... M and i≠j.

As Probe Systems for new replicas are added, new fields are added to each Target Record by the ProbeHead and ProbeEcho for the Probe System corresponding to a given Replica. As Probe Systems go dormant, their fields become dormant. For example, if ProbeSystem_i goes dormant, then there are no updates to Head_i and Echo_i_j. Dormancy is evaluated and determined by the ProbeHead during reporting. So, dormancy of ProbeSystem_i is evaluated by all other Probe Systems, according to some policy or rule. For example, if a replica associated with a Probe System goes down, the ProbeSystem must be evaluated by other Probe Systems so that the dormancy can be reported. In one embodiment, a policy or rule for this evaluation is the length of time since a Head_i update was issued by the ProbeSystem_i.

In practice in some embodiments, multiple potential echoes are batched in ProbeEcho j and written together in the Target Record. Batching induces a delay in discovery but does not affect fidelity of latency measurements. Writing the Echo fields in batches also allows the ProbeEcho to conserve write throughput budget used up by the Probe System.

The Probe System

Figure 3:
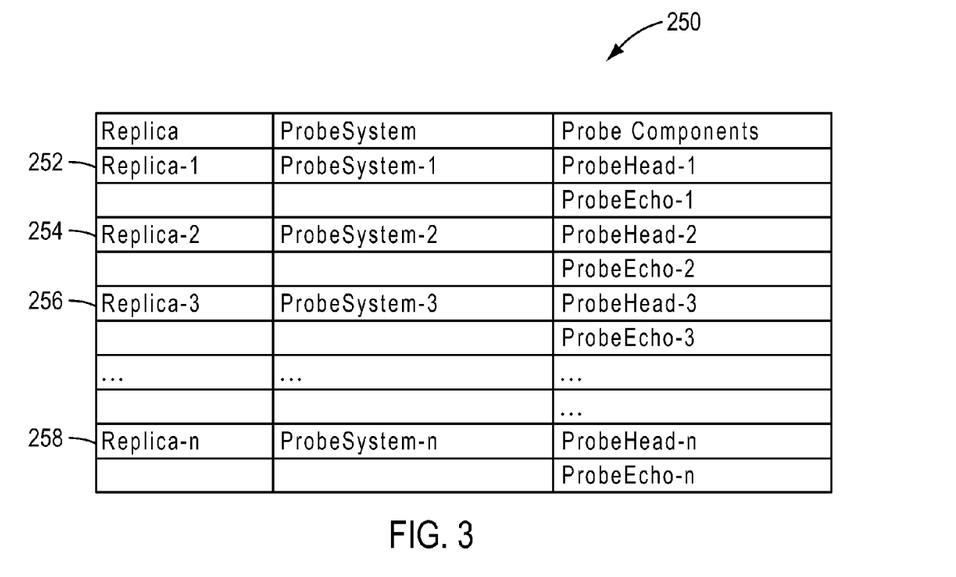
FIG. 3 illustrates the probe system and its components in an n-replica system.

FIG. 3 illustrates an embodiment of the probe system and its components in an n-replica system. The Probe System is instantiated for each Replica. For example, ProbeSystem_i is the instance corresponding to Replica_i. The ProbeSystem_i includes ProbeHead_i and ProbeEcho_i. For example, Replica_1 252 has ProbeSystem_1, which includes ProbeHead_1 and ProbeEcho_1, Replica_2 254 has ProbeSystem_2 and ProbeHead_2 and ProbeEcho_2, and similarly for Replica_3 256 to Replica_n 258.

The ProbeHead is the component of Probe System that is responsible for updating the Head_i field for a specific replica i. ProbeHead is instantiated as ProbeHead_i, for Replica_i and ProbeHead_i is the only instance that updates Head_i. Not only does the ProbeHead_i instance decide when to issue a new Epoch value in Head_i, but ProbeHead_i also reads Echo_j_i, which is updated by ProbeEcho j, and directly publishes latencies (in "real time") to the monitoring system.

The ProbeEcho is the component of Probe System responsible for updating the Echo field for a specific replica pair. ProbeEcho is instantiated as ProbeEcho_i, for Replica_i and ProbeEcho_i is the only instance updating Echo_i_j, in response to all Head_j updates issued by ProbeHead_j at Replica_j. In other words, ProbeEcho_i reads each TargetRecord to determine whether the value of Head_j has been updated. If Head_j has been updated, ProbeEcho_i issues the Echo_i_j update. In one embodiment the system batches these updates to minimize impact on system write throughput.

Figure 4:
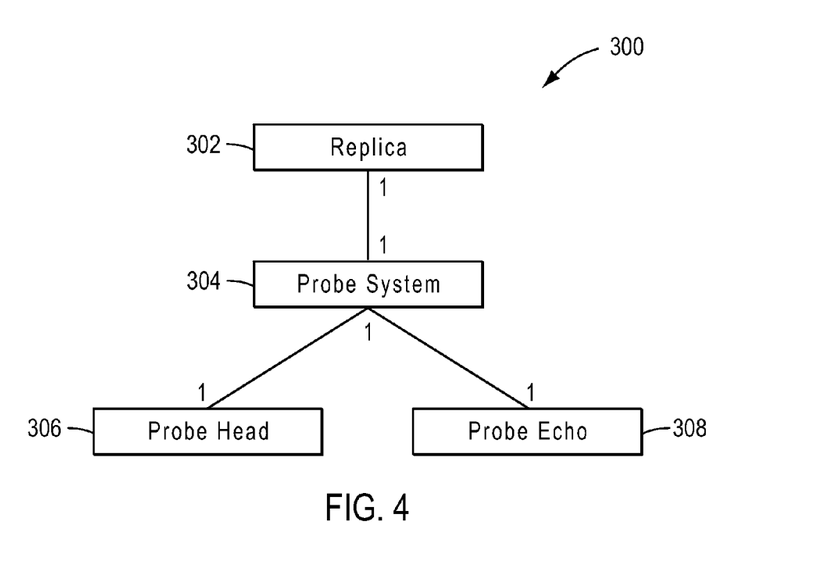
FIG. 4 illustrates the component instance cardinality of the probe system.

FIG. 4 illustrates the component instance cardinality of an embodiment of the probe system. The diagram indicates that there is one probe system 304 for each replica 302 and that that probe system 304 includes its own ProbeHead 306 and ProbeEcho 308.

Figure 5:
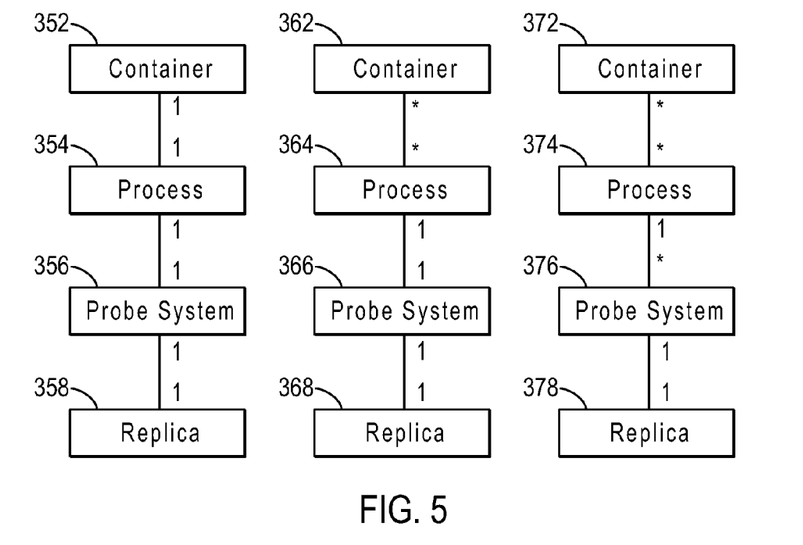
FIG. 5 illustrates the deployment instance cardinality.

FIG. 5 illustrates the deployment instance cardinality of embodiments of the probe system. The diagram indicates that in one embodiment the probe system 356 is deployed as one system per Container 352, where a Container is any system used for isolation of execution, security enforcement, or the like. For example, in one embodiment, the Container is a Linux Container. In another embodiment, the Container is a J2EE Container; while in yet another embodiment, the Container is a virtual machine. Thus, a Container can be recognized at any level where access control and connectivity barriers are enforced. In another embodiment, the probe system is deployed as multiple systems 366 per Container 362. In yet another embodiment, the probe system 376 can be deployed as multiple probe systems per process 374.

In the case of one system per Container, each probe system runs separately in a Container per replicate. Thus, ProbeSystem_i runs in Container_i and probes replication from Replica_i. The Container has access to Replica_i.

In the case of multiple probe systems per Container, multiple ProbeSystems are bundled and run on the same Container. The Container has access to the multiple ProbeSystems.

In the case of multiple Probe Systems per process, each probe system is implemented as a composite object that contains the ProbeHead Object and the ProbeEcho object. The composite object has an instance per replica. The same composite object can be used in the case of one system per Container and multiple systems per Container. In the current embodiment, Each ProbeHead and each ProbeEcho object instance runs as a separate thread in the same multi-threaded process. The process has access, via the containing Container, to all replica systems. Choosing multiple Probe Systems per process depends on resource availability and the maximum expected load on a single process probe system collection.

Interactions Between Probe System and Target Record

Figure 6:
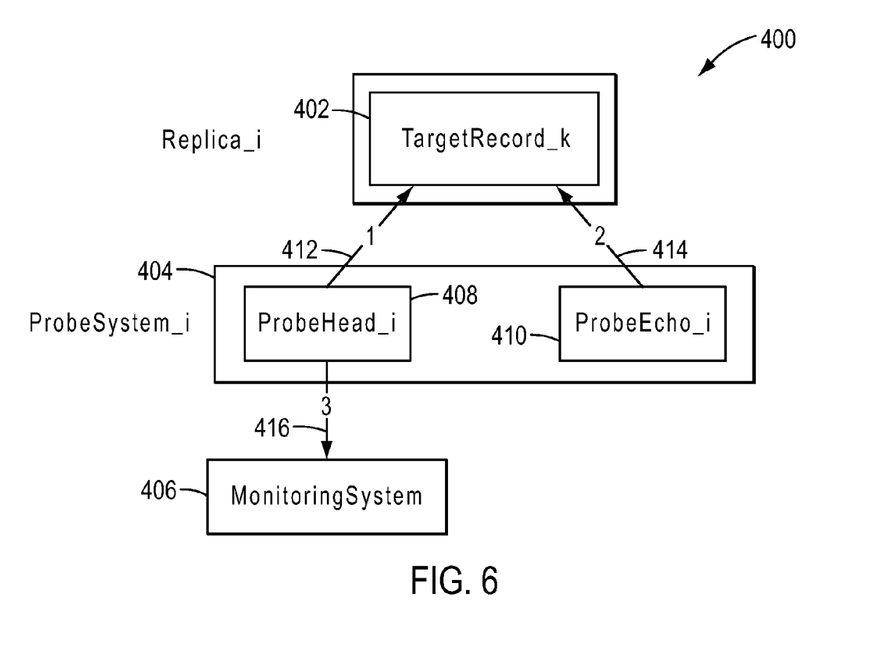
FIG. 6 illustrates the interactions between a Probe System and a target record.

FIG. 6 illustrates the interactions between a Probe System and a target record in an embodiment of the present invention. These interactions are described in greater detail in FIGS. 7, 8, and 9. Arrow 1 412 in FIG. 6 illustrates the actions of the ProbeHead_i 408 on the TargetRecord_k 402. Those actions include writing the Head_i field in each Target Record 402 and reading each Target Record 402 to obtain the Echo_i_j field for each j, in order to publish a report on the latencies, described below.

Arrow 2 414 in FIG. 6 illustrates the actions of the ProbeEcho_i 410. Those actions include reading each TargetRecord_k 402 to determine if there is a new Head_j value. For each new Head_j Epoch value (which indicates a new measurement episode), the ProbeEcho updates the latency and Epoch value in the Echo_i_j field of TargetRecord_k 402. In one embodiment, the ProbeEcho updates the latency and Epoch values in memory. After accruing a sufficient number of updates in memory, the ProbeEcho then applies them to the TargetRecord_k. This aggregation preserves the write-throughput budget that is allowed for the Probe System.

Arrow 3 416 in FIG. 6 illustrates the actions of the ProbeHead_i 408, which publishes a report of the replication latencies to a monitoring system 406 for transactions originating in Replica_i and terminating on Replica_j based on the read Echo_i_j latency values for recent or current probes.

Figure 7:
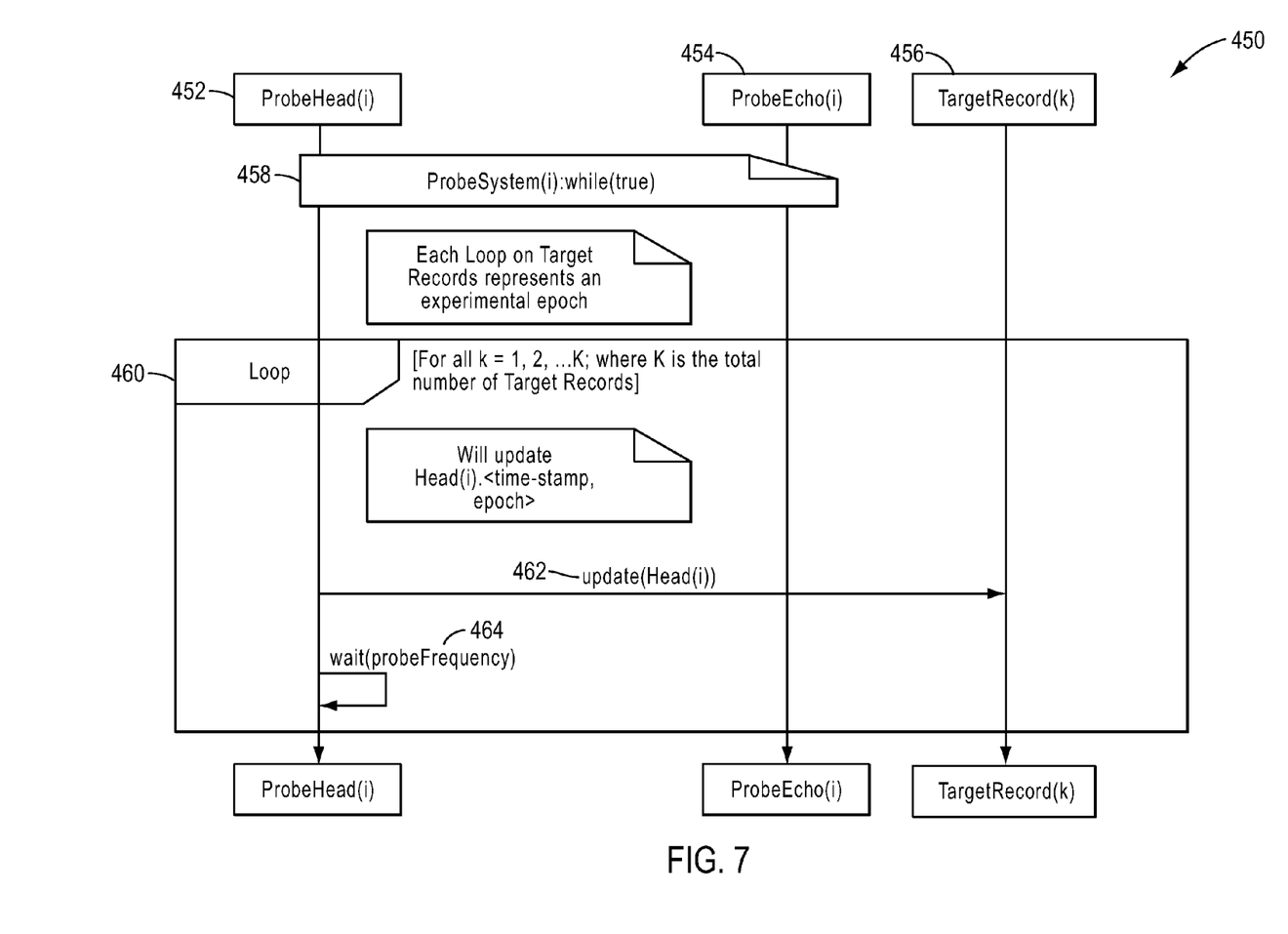
FIG. 7 illustrates the action of ProbeHead_i on TargetRecord_k.
Figure 8:
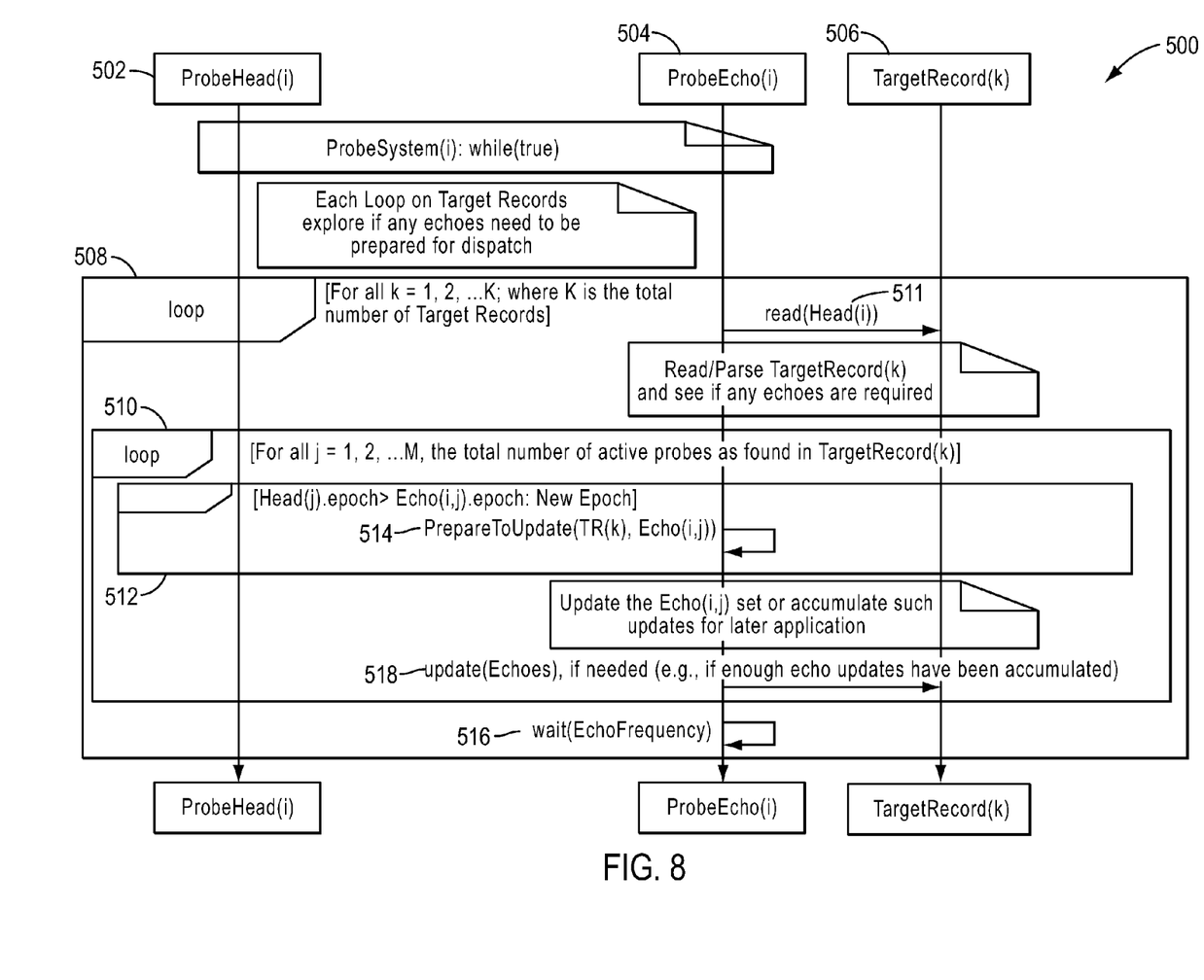
FIG. 8 illustrates the action of ProbeEcho_i on TargetRecord_k.
Figure 9:
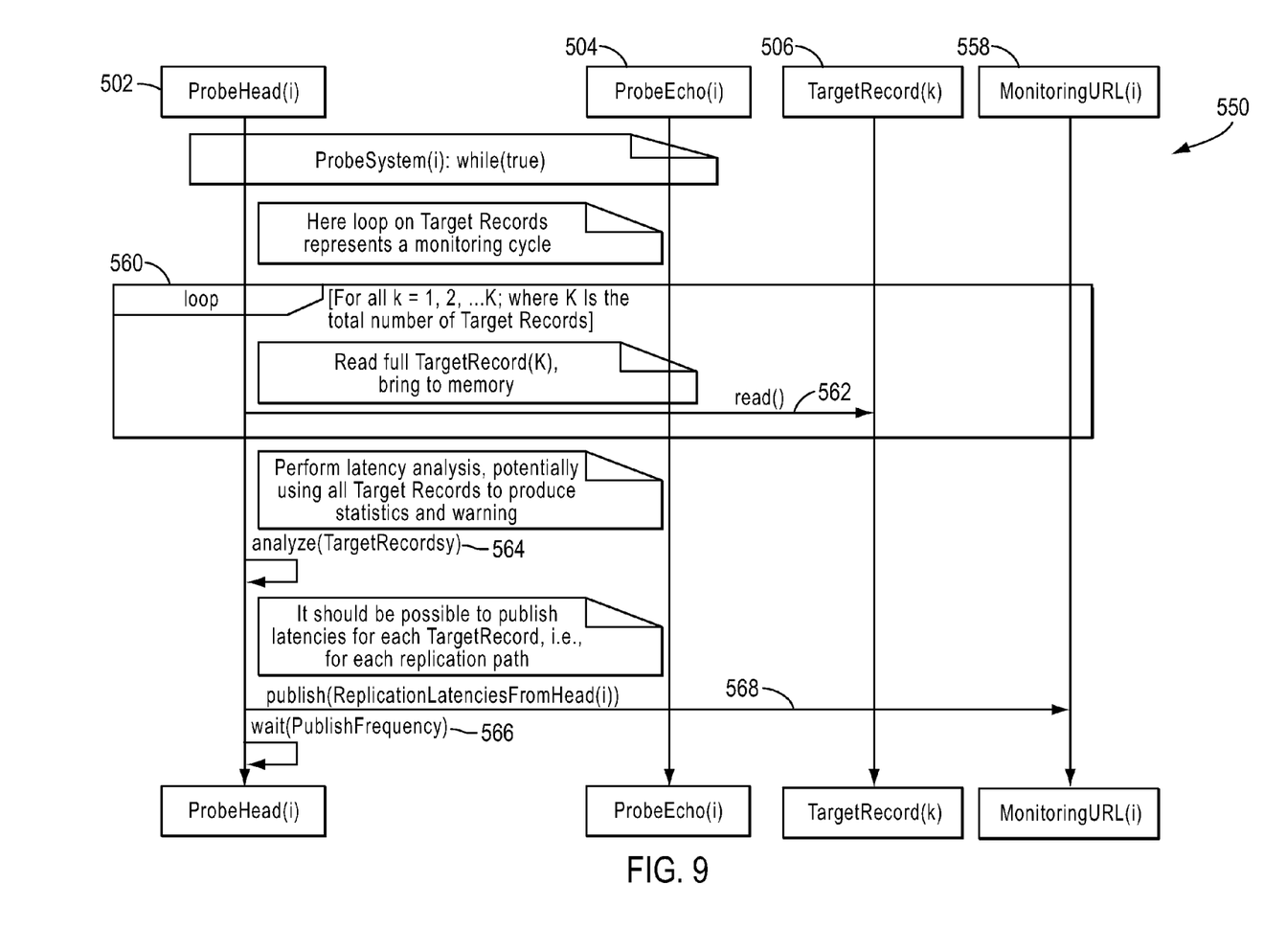
FIG. 9 illustrates the action of publishing a per Target Record to a monitoring URL_i.

FIGS. 7, 8, and 9 describe these actions in more detail. FIG. 7 illustrates the action of ProbeHead_i 452 on TargetRecord_k 456 in a standard UML diagram 450. In a preliminary step, a Probe becomes active once it is installed and started and it connects to the Replica to which it is configured to connect. The diagram 450 indicates that while the ProbeSystem 452, 454 is active, the ProbeHead_i 452 updates in step 462 the time stamp and Epoch value of the Head_i field in each TargetRecord_k 456 (where k≠i), after which it waits in step 464 an interval of time depending on a probeFrequency value, which determines how often the probe system should run. The time stamp is a standard time stamp and the Epoch value, in one embodiment, is a monotonically increasing value that represents the experimental epoch.

FIG. 8 illustrates the action of ProbeEcho_i 504 on TargetRecord_k 506 in a standard UML diagram 500. The diagram 500 indicates that while the ProbeSystem 502, 504 is active, the Head_i field of TargetRecord_k 506 is read, in step 511, to see if any echoes are needed. If an echo is needed, then for each of the active probes in loop 510 in TargetRecord_k 506, the ProbeEcho_i 502 prepares to update, in step 514, the Echo_i_j field in TargetRecord_k 506. However, an update of the Echo_i_j field only occurs if the Echo_i_j's Epoch value is less than the Head_j's Epoch value, as shown in 512. If so, then the update consists of (1) setting the Echo_i_j's Epoch value to be equal to the Head_j's Epoch value, and (2) setting the latency value of Echo_i_j to be equal to the local time stamp of ProbeEcho_i less the time stamp reported in Head_j that contained the Epoch value. These updates are set forth in the equations below, where the "i" and "j" indices are shown in parentheses.

let $t$=TargetRecord($k$) in if ($t$·Echo($i,j$)·epoch<$t$·Head($j$)·epoch) then $t$·Echo($i,j$)·epoch=$t$·Head($j$)·epoch $t$·Echo($i,j$)·latency=($t$·ProbeEcho($i$)·timestamp−$t$·Head($j$)·timestamp)

As mentioned above, in one embodiment, these updates occur in memory and are then collected to update the Target Record in order to improve efficiency.

FIG. 9 illustrates the action of publishing a per Target Record to a monitoring URL_i 558. The FIG. 550 indicates that ProbeHead_i 552 reads the TargetRecords_k 556 into memory in step 562, performs a latency analysis on the records in step 564, and publishes the latencies in step 568 for each Target Record 556, i.e., for each replication path j tested by ProbeHead_i 552. These results are then sent to a monitoring URL_i 558. Alternatively, a latency report is published for all target records rather than one report for each TargetRecord_k 556. Before another report is created, ProbeHead_i 552 waits for a time related to the PublishFrequency.

The quality of the latency measurement in the ProbeSystem in an embodiment of the present invention depends to a significant extent on the ProbeEcho's read frequency, which, in turn, depends on the read budget that is available to the Probe System.

Delays in generating latency reports depend, in one embodiment, largely on the length of experimental cycles or ProbeHead write frequencies, which in turn, depend on the write budge that is available to the Probe System.

Hardware Overview

Figure 10:
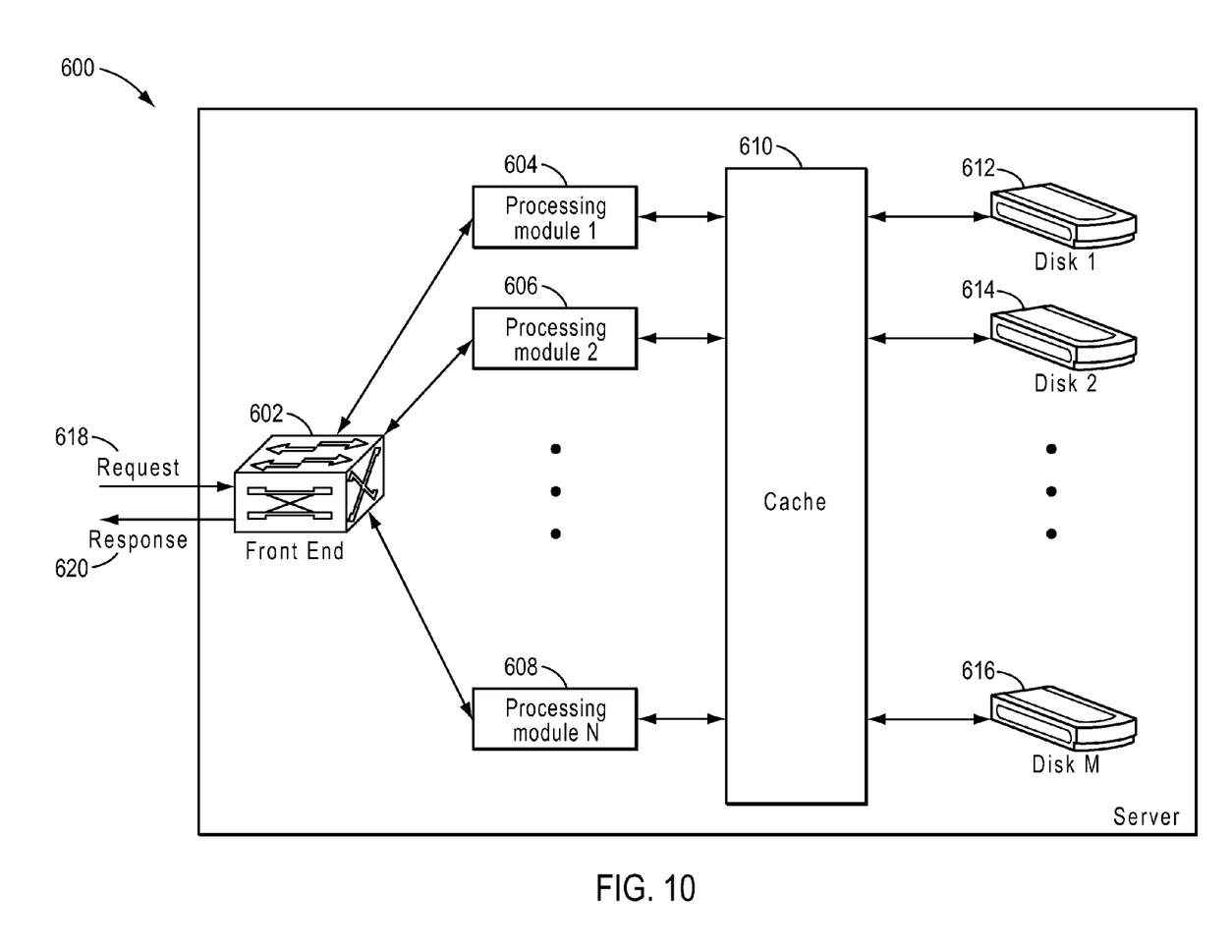
FIG. 10 illustrates a server in accordance with yet another embodiment.

FIG. 10 is a block diagram of a computer system 600 upon which an embodiment of the present invention may be implemented. The computer system 600 includes a front end 602, a number of processing modules 604, 606, 608, a disk cache 610, and a number of disk storage devices 612, 614, 616. The front end device 602 receives an incoming request 618 for service and distributes that request to one of the processing modules 604, 606, 608. The processing module handling the request runs a program to service the request using data in the disk cache 610, which was either already present or brought in from the disk storage devices 612, 614, 616 by the processing module. After the processing module completes the program needed to service the request, the processing module returns a response 620 to the requester. Each processing module 604, 606, 608 has at least one central processing unit, sufficient main memory for holding programs and data, its own processing cache, and other support hardware. In one embodiment, the computer system is multi-threaded, with each processing module 604, 606, 608 operating on a thread in a process that is accessible to all of the processing modules 604, 606, 608. Each processing module obtains one or more programs containing processor instructions at least for servicing the request from the disk storage devices 612, 614, 616 or other computer readable storage media.

Figure 11:
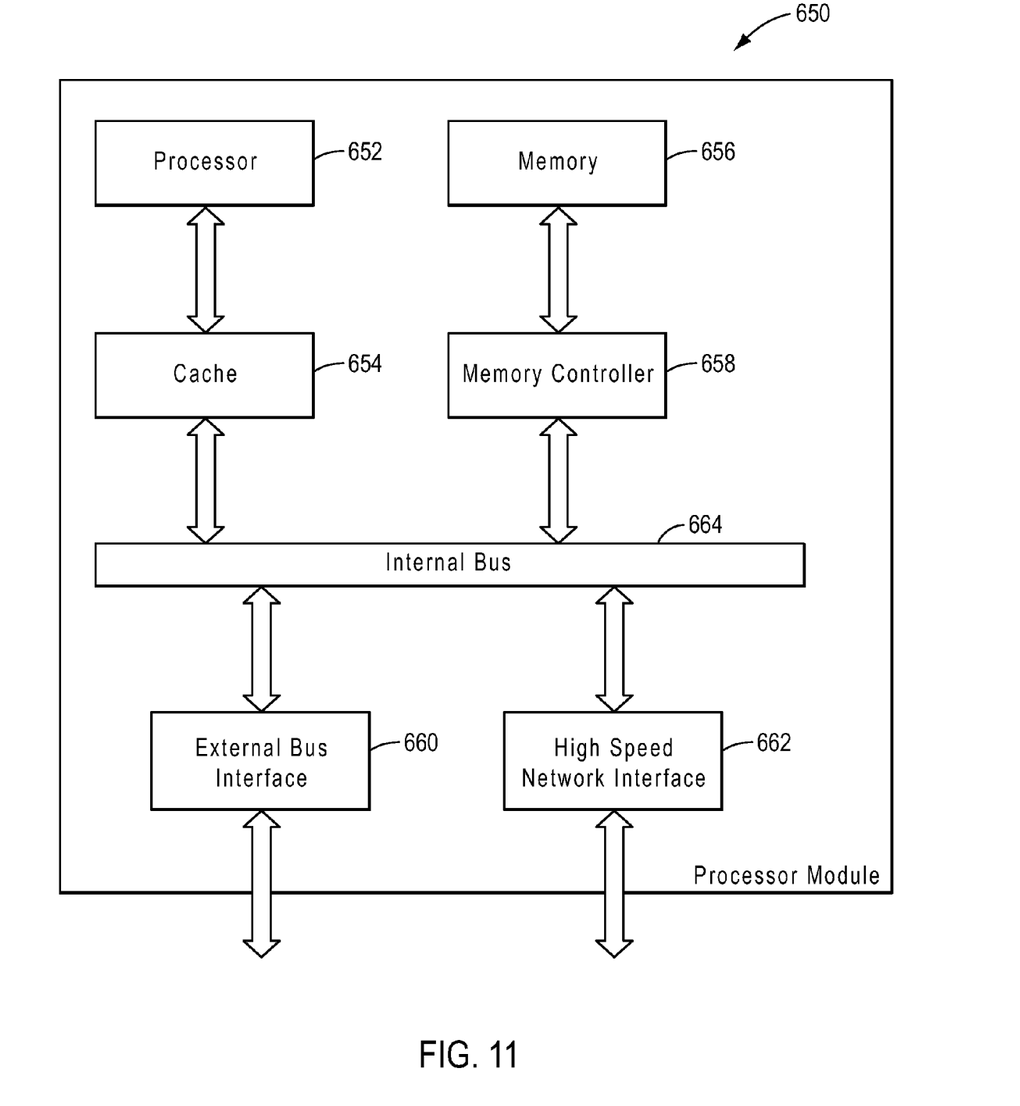
FIG. 11 illustrates in one embodiment a processor module shown in FIG. 10.

FIG. 11 is a block diagram of an embodiment of a processing module 650 shown in FIG. 10. The module includes a processor 652, a memory 656, a processor cache 654, a memory controller 658, an external bus interface 660, and a high speed network interface 662, all connected internal by internal bus 664. The processor executes instructions and operates on data that have been loaded into cache from the memory 656, via the memory controller 658 and the internal bus 664. The memory 656 obtains processor instructions and data from either the external bus 660 or the high speed network interface 662, via the internal bus 664.

The term "storage media" as used herein refers to any non-transitory media that stores data and/or instructions that cause a machine to operate in a specific fashion. Such storage media may comprise non-volatile media and/or volatile media. Non-volatile media includes, for example, optical or magnetic disks, such as storage devices 612, 614, 616. Volatile media includes dynamic memory, such as main memory 656 in FIG. 11. Common forms of storage media include, for example, a floppy disk, a flexible disk, a hard disk, solid state drive, magnetic tape, or any other magnetic data storage medium, a CD-ROM, or any other optical data storage medium, any physical medium with patterns of holes, a RAM, a PROM, an EPROM, a FLASH_EPROM, NVRAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 664 in FIG. 11. Transmission media can also take the form of acoustic or light waves, such as those generated during radio-wave and infra-red data communications.

Various forms of media may be involved in carrying one or more sequences of one or more instructions to processor 652 for execution. For example, the instructions may initially be carried on a magnetic disk or solid state drive of a remote computer. The remote computer can load the instructions into its dynamic memory and send the instructions over the external bus interface 660 or the high speed network interface 662, which in some embodiments can be 10G Ethernet.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method of probing replication paths in a computer system, the method comprising:
   creating a new instance of a probe system on a first replica computer system, the probe system including a probe head and a probe echo;
   creating a target record on a second replica computer system, the target record including a head field and an echo field, wherein the head field includes an epoch value and a time stamp and the echo field includes an epoch value and a latency value;
   updating the epoch value and the time stamp in the head field by sending the probe head of the new instance from the first replica computer system to the second replica computer system;
   updating the epoch value and the latency value in the echo field by sending the probe head of the new instance from the first replica computer system to the second replica computer system if the epoch value in the echo field is less than the epoch value in the head field, the latency value being a measurement of time to communicate between the first and second replica computer systems; and
   obtaining a report that gives the communication latency for any communication starting in the first replica computer system and ending in the second replica computer system.

2. The method of probing in claim 1,
   wherein the second replica computer system has access to a multi-directory storage system; and
   wherein the target record has a name that hashes to a distinct directory in the storage system.

3. The method of probing in claim 1, wherein the epoch value is a monotonically-increasing number.

4. The method of probing in claim 1,
   wherein the updated epoch value in the echo field is equal to the epoch value of the head field; and
   wherein the updated latency value in the echo field is equal to the difference between the time stamp in the echo field and the time stamp in the head field.

5. The method of probing in claim 1, wherein sending the probe head includes sending the probe head after waiting an interval of time based on a probe head frequency value.

6. The method of probing in claim 1, wherein sending the probe echo includes sending the probe echo after waiting an interval of time based on a probe echo frequency value.

7. The method of probing in claim 6, wherein a higher the probe echo frequency value improves the latency measurement.

8. The method of probing in claim 1, wherein obtaining a report includes obtaining a report after waiting an interval of time based on a publish frequency value.

9. The method of probing in claim 8, wherein a higher publish frequency value lowers interval of time.

10. The method of probing in claim 1, wherein obtaining a report includes performing an analysis of the target record on the second replica computer system.

11. The method of probing in claim 10, wherein obtaining a report further comprises sending the analysis to an URL dedicated to the first replica computer system.

12. The method of probing in claim 1,
    wherein the report is a first-to-second report; and
    further comprising:
       creating a new instance of a probe system on a third replica computer system, the probe system including a probe head and a probe echo;
       wherein the target record on the second replica computer system adds a head and echo field for the third replica computer system,
       wherein the head field includes an epoch value and a time stamp and the echo field includes an epoch value and a latency value;
       updating the epoch value and the time stamp in the head field of the third replica computer system by sending the probe head of the new instance on the third replica computer system from the third replica computer system to the second replica computer system;
       updating the epoch value and the latency value in the echo field of the third replica computer system by sending the probe head of the new instance on the third replica computer system from the third replica computer system to the second replica computer system if the epoch value in the echo field is less than the epoch value in the head field of the third replica computer system, the latency value being a measurement of time to communicate between third and second replica computer systems; and
       obtaining another report that gives the communication latency for a communication starting in the third replica computer system and ending in the second replica computer system,
       the other report being a third-to-second report.

13. The method of probing in claim 12, wherein the first-second report and the third-second report are aggregated into a common report.

14. The method of probing in claim 12, wherein
    sending a probe echo from the first replica computer system to the second replica computer system and
    sending a probe echo from the third replica computer system to the second replica are
    collected together in the second replica computer system for batch processing of the probe echoes.

15. The method of probing in claim 12, wherein the epoch value in the target record for the third replica computer system is a monotonically-increasing number.

16. A non-transitory machine readable storage medium comprising one or more sequences of instructions, which, when executed by one or more processors, perform a method comprising the steps of:
    creating a new instance of a probe system on a first replica computer system, the probe system including a probe head and a probe echo;
    creating a target record on a second replica computer system, the target record including a head field and an echo field, wherein the head field includes an epoch value and a time stamp and the echo field includes an epoch value and a latency value;
    updating the epoch value and the time stamp in the head field by sending the probe head of the new instance from the first replica computer system to the second replica computer system;
    updating the epoch value and the latency value in the echo field by sending the probe echo of the new instance from the first replica computer system to the second replica computer system if the epoch value in the echo field is less than the epoch value in the head field, the latency value being a measurement of time to communicate between first and second replica computer systems; and
    obtaining a report that gives the communication latency for a communication starting in the first replica computer system and ending in the second replica computer system.

17. The non-transitory machine-readable storage medium as recited in claim 16,
wherein the second replica computer system has access to a multi-directory storage system; and
wherein the target record has a name that hashes to a distinct directory in the storage system.

18. The non-transitory machine-readable storage medium as recited in claim 16, wherein the epoch value is a monotonically-increasing number.

19. The non-transitory machine-readable storage medium as recited in claim 16,
wherein the updated epoch value in the echo field is equal to the epoch value of the head field; and
wherein the updated latency value in the echo field is equal to the difference between the time stamp in the echo field and the time stamp in the head field.

20. The non-transitory machine-readable storage medium as recited in claim 16, wherein sending the probe head includes sending the probe head after waiting an interval of time based on a probe head frequency value.

21. The non-transitory machine-readable storage medium as recited in claim 16, wherein sending the probe echo includes sending the probe echo after waiting an interval of time based on a probe echo frequency value.

22. The non-transitory machine-readable storage medium as recited in claim 21, wherein a higher the probe echo frequency value improves the latency measurement.

23. The non-transitory machine-readable storage medium as recited in claim 16, wherein obtaining a report includes obtaining a report after waiting an interval of time based on a publish frequency value.

24. The non-transitory machine-readable storage medium as recited in claim 23, wherein a higher publish frequency value lowers interval of time.

25. The non-transitory machine-readable storage medium as recited in claim 16, wherein obtaining a report includes performing an analysis of the target record on the second replica computer system.

26. The non-transitory machine-readable storage medium as recited in claim 25, wherein obtaining a report further comprises sending the analysis to an URL dedicated to the first replica computer system.

27. The non-transitory machine-readable storage medium as recited in claim 16,
wherein the report is a first-to-second report; and
further comprising:
creating a new instance of a probe system on a third replica computer system, the probe system including a probe head and a probe echo;
wherein the target record on the second replica computer system adds a head and echo field for the third replica computer system,
wherein the head field includes an epoch value and a time stamp and the echo field includes an epoch value and a latency value;
updating the epoch value and the time stamp in the head field of the third replica by sending a probe head from the third replica computer system to the second replica computer system;
updating the epoch value and the latency value in the echo field of the third replica computer system by sending a probe echo from the third replica computer system to the second replica computer system if the epoch value in the echo field is less than the epoch value in the head field of the third replica computer system, the latency value being a measurement of time to communicate between third and second replica computer systems; and
obtaining a report that gives the communication latency for a communication starting in the third replica computer system and ending in the second replica computer system, the report being a third-to-second report.

28. The non-transitory machine-readable storage medium as recited in claim 27, wherein the first-to-second report and the third-to-second report are aggregated into a common report.

29. The non-transitory machine-readable storage medium as recited in claim 27, wherein sending a probe echo from the first replica computer system to the second replica computer system and sending a probe echo from the third replica computer system to the second replica computer system are collected together in the second replica computer system for batch processing of the probe echoes.

30. The non-transitory machine-readable storage medium as recited in claim 27, wherein the epoch value for the third replica computer system in the target record is a monotonically-increasing number.

31. A computer system including one or more processing modules, each processing module including a processor and a memory, the memories containing one or more sequences of instructions, which, when executed by the processors of the one or more processing modules, perform the steps of:
creating a new instance of a probe system on a first replica computer system, the probe system including a probe head and a probe echo;
creating a target record on a second replica computer system, the target record including a head field and an echo field, wherein the head field includes an epoch value and a time stamp and the echo field includes an epoch value and a latency value;
updating the epoch value and the time stamp in the head field by sending the probe head of the new instance from the first replica computer system to the second replica computer system;
updating the epoch value and the latency value in the echo field by sending the probe echo of the new instance from the first replica computer system to the second replica computer system if the epoch value in the echo field is less than the epoch value in the head field, the latency value being a measurement of time to communicate between first and second replica computer systems; and
obtaining a report that gives the communication latency for a communication starting in the first replicacomputer system and ending in the second replica computer system.

* * * * *